C. F. UECKE.
MOTOR.
APPLICATION FILED JAN. 22, 1919.

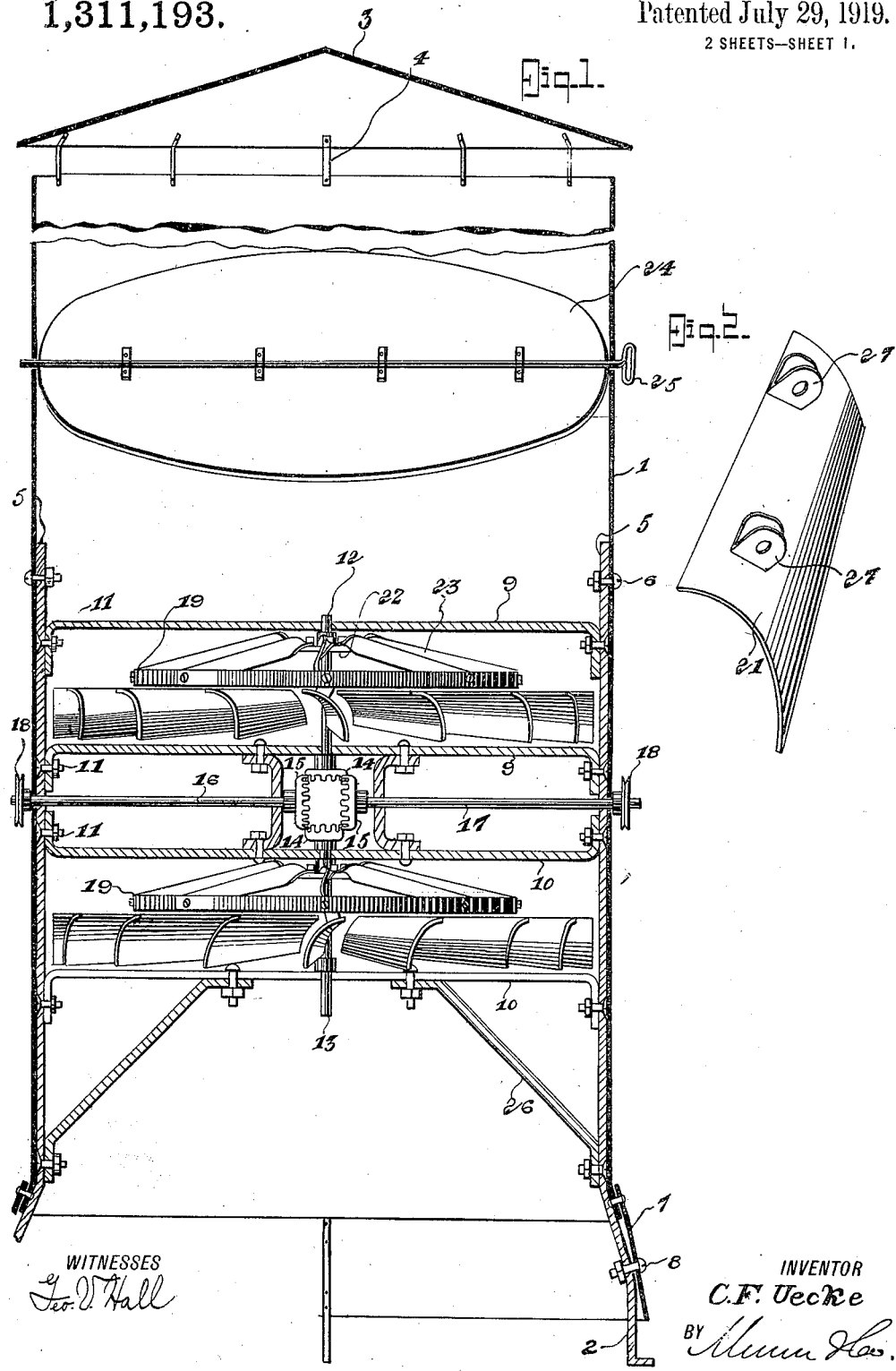

1,311,193.

Patented July 29, 1919.
2 SHEETS—SHEET 2.

UNITED STATES PATENT OFFICE.

CHARLES F. UECKE, OF NEW LONDON, WISCONSIN.

MOTOR.

1,311,193.   Specification of Letters Patent.   Patented July 29, 1919.

Application filed January 22, 1919.   Serial No. 272,513.

*To all whom it may concern:*

Be it known that I, CHARLES F. UECKE, a citizen of the United States, and a resident of New London, in the county of Waupaca and State of Wisconsin, have invented certain new and useful Improvements in Motors, of which the following is a specification.

My invention is an improvement in motors, and has for its object to provide a motor of the character adapted to be operated by air currents, wherein a draft pipe is provided in which the motor is arranged, the pipe acting to circumscribe and direct and intensify the current that acts upon the motor.

In the drawings,

Figure 1 is a vertical section through the draft pipe with the motor in elevation;

Fig. 2 is a perspective view of one of the blades;

Figure 3:
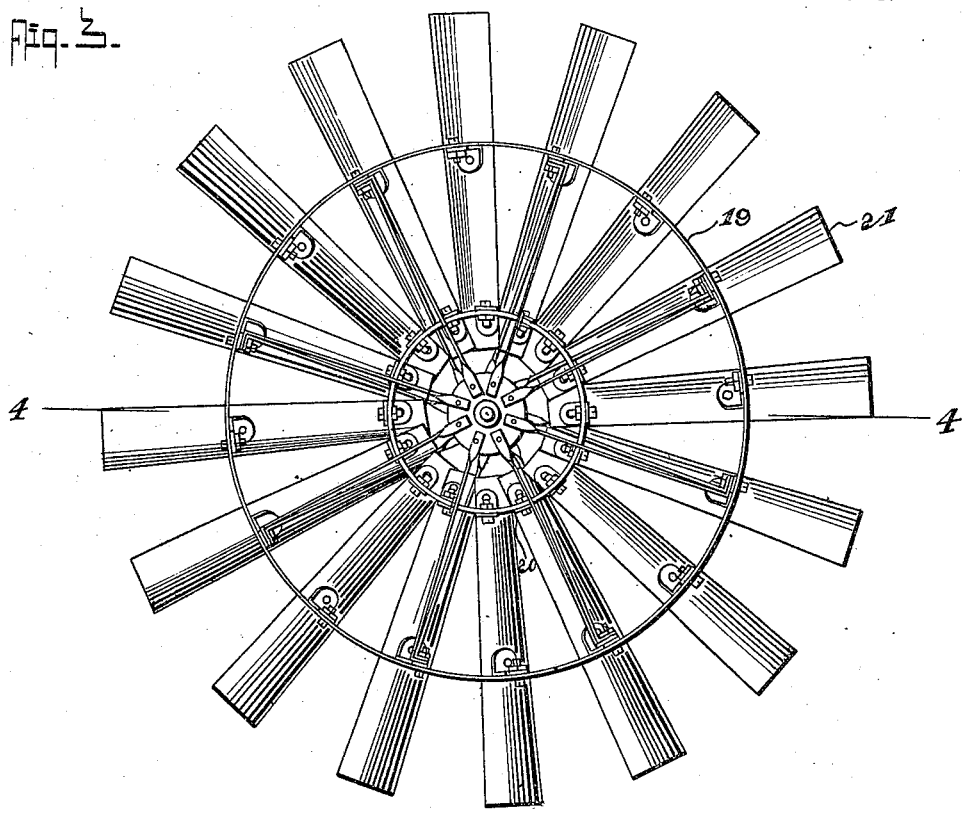
Fig. 3 is a top plan view of one of the air controlled elements.
Figure 4:
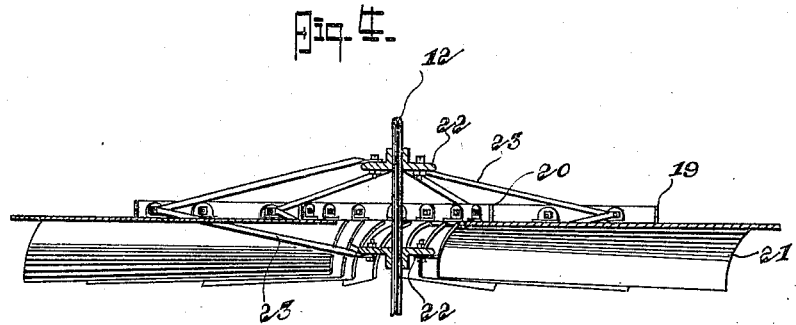
Fig. 4 is a section on the line 4—4 of Fig. 3.

In the present embodiment of the invention, a draft pipe 1 is provided, the said pipe being of considerable length and of sufficient diameter, and the lower end of the said pipe or casing is spaced above the supporting surface by feet or legs 2. At the top of the pipe, which may be as great as five hundred feet in length, there is arranged a hood 3 connected to the pipe in spaced relation by brackets 4, the said hood preventing the entrance of rain and the like into the top of the pipe.

The feet 2 are preferably integral with bars 5 which are secured to the pipe internally thereof and at diametrically opposite points, the said bars being secured to the pipe at their upper ends by bolts and nuts 6 and being secured to a detachable petticoat 7 at the lower end of the pipe, by means of other bolts and nuts 8. These bars 5, which are of material of sufficient weight and cross section, are connected by pairs of cross bars or spiders 9 and 10, the pairs being arranged in vertical spaced relation.

The ends of the cross bars or spiders are bent laterally as shown and lapped upon the inner faces of the bars 5 and are secured to the said bars by screw bolts 11. Shafts 12 and 13 are journaled in the members of the pairs, the shafts being in alinement, and a fan is secured to each shaft. The adjacent ends of the shafts have gear wheels 14, which mesh with similar wheels 15 on the inner ends of shafts 16 and 17 which extend through the bars 5 and through the pipe wall and have pulleys 18 at their outer ends from which power may be taken by means of belts or the like.

Each of the fans or wind wheels is composed of an outer ring 19 and an inner ring 20, which are connected by blades 21. The blades are arranged in radial relation and each blade, as shown more particularly in Figs. 1 and 2, is curved transversely, and the blades of each wheel are similarly arranged. A pair of hubs 22 is provided in connection with each wheel, the said hubs being arranged above and below the plane of the rings 19 and 20, and the said hubs are connected to the ring 19 by spokes 23. Thus the two hubs are held in alinement and in spaced relation, and the said hubs are arranged on the shafts 12 and 13 and are secured thereto in any suitable or desired manner. The arrangement of the blades on the lower wheel, that is, the wheel between the spiders 18, is the opposite of that of the blades of the upper wheel, that is, the wheel between the spiders 9.

Hence it will be obvious that when the wheels are rotated by a current of air uprising through the pipe they will move in opposite directions and will act in the same direction on the shafts 16 and 17, rotating the said shafts 16 and 17 in opposite directions. The shafts 12 and 13 will rotate in the same direction.

A damper 24 is arranged in the pipe above the motor, the said damper having a handle 25 outside the pipe for convenience in manipulating the same, and it will be obvious that by turning the damper transversely to the pipe the current of air will be shut off, thus stopping the motor. When it is desired to start the motor it is only necessary to move the damper into open position. The lowermost member of the spider 10 is braced against the bars 5 by inclined braces 26, and it will be noticed that each blade 21 has angle plates 27 on its convex face for connection with the rings 19 and 20.

I claim:

In combination, a draft flue, a plurality of pairs of cross bars secured within the flue diametrically thereof, a shaft journaled in each pair of bars at the axis of the flue, a wind wheel secured to each shaft, said wheels being mounted to rotate in opposite directions, alined cross shafts between the pairs of cross bars, said shafts being journaled at their outer ends in the wall of the flue, braces connecting adjacent bars of the pairs for supporting the inner ends of the shafts, and gear connections between the shafts of the inner walls and the last named shafts.

CHARLES F. UECKE.

Witnesses:
E. C. JOST,
E. C. ZILLENAST.

Copies of this patent may be obtained for five cents each, by addressing the "Commissioner of Patents, Washington, D. C."